United States Patent [19]

Takahashi et al.

[11] Patent Number: 5,090,006
[45] Date of Patent: Feb. 18, 1992

[54] DISK RECORD/PLAYBACK MACHINE WITH DISK REST MOVABLE TO AN INTERMEDIATE POSITION BETWEEN THE DISK DISCHARGE AND RECORD/PLAYBACK POSITIONS DURING STAND-BY MODE

[75] Inventors: Junji Takahashi; Isami Kenmotsu, both of Saitama, Japan

[73] Assignee: Pioneer Electronic Corporation, Tokyo, Japan

[21] Appl. No.: 716,766

[22] Filed: Jun. 19, 1991

Related U.S. Application Data

[63] Continuation of Ser. No. 230,827, Aug. 11, 1988, abandoned.

Foreign Application Priority Data

Aug. 31, 1987 [JP] Japan .................................. 62-217685

[51] Int. Cl.⁵ .................. G11B 1/00; G11B 25/04; G11B 19/10; G11B 17/04
[52] U.S. Cl. .................................. 369/258; 369/77.1; 369/77.2
[58] Field of Search .............. 369/75.1, 75.2, 77.1, 369/77.2, 36, 38, 291, 258, 264

[56] References Cited

U.S. PATENT DOCUMENTS

| 4,578,787 | 3/1987 | Shimizu et al. | 369/77.2 |
| 4,672,598 | 6/1987 | Koken et al. | 369/75.2 |
| 4,692,916 | 9/1987 | Rouws | 369/75.2 |
| 4,815,065 | 3/1989 | Rouws | 369/75.2 X |
| 4,825,429 | 4/1989 | Matsumoto | 369/75.2 |

FOREIGN PATENT DOCUMENTS 2107506 4/1983 United Kingdom ............ 369/77.1

*Primary Examiner*—Stuart S. Levy
*Assistant Examiner*—Kenneth B. Wells
*Attorney, Agent, or Firm*—Sughrue, Mion, Zinn, Macpeak & Seas

[57] ABSTRACT

A disk record/playback machine including a carriage which is movable relative to a casing, racks which are slidably mounted on the carriage, a locking device for locking the racks to the carriage, a rest for supporting a disk and cams for supporting the rest to the racks. The rest is movable to a first elevational position during a disk discharge mode, to a second elevational position in a record/playback mode, and to a third elevational position located between the first and second elevational positions, during a stand-by mode.

9 Claims, 4 Drawing Sheets

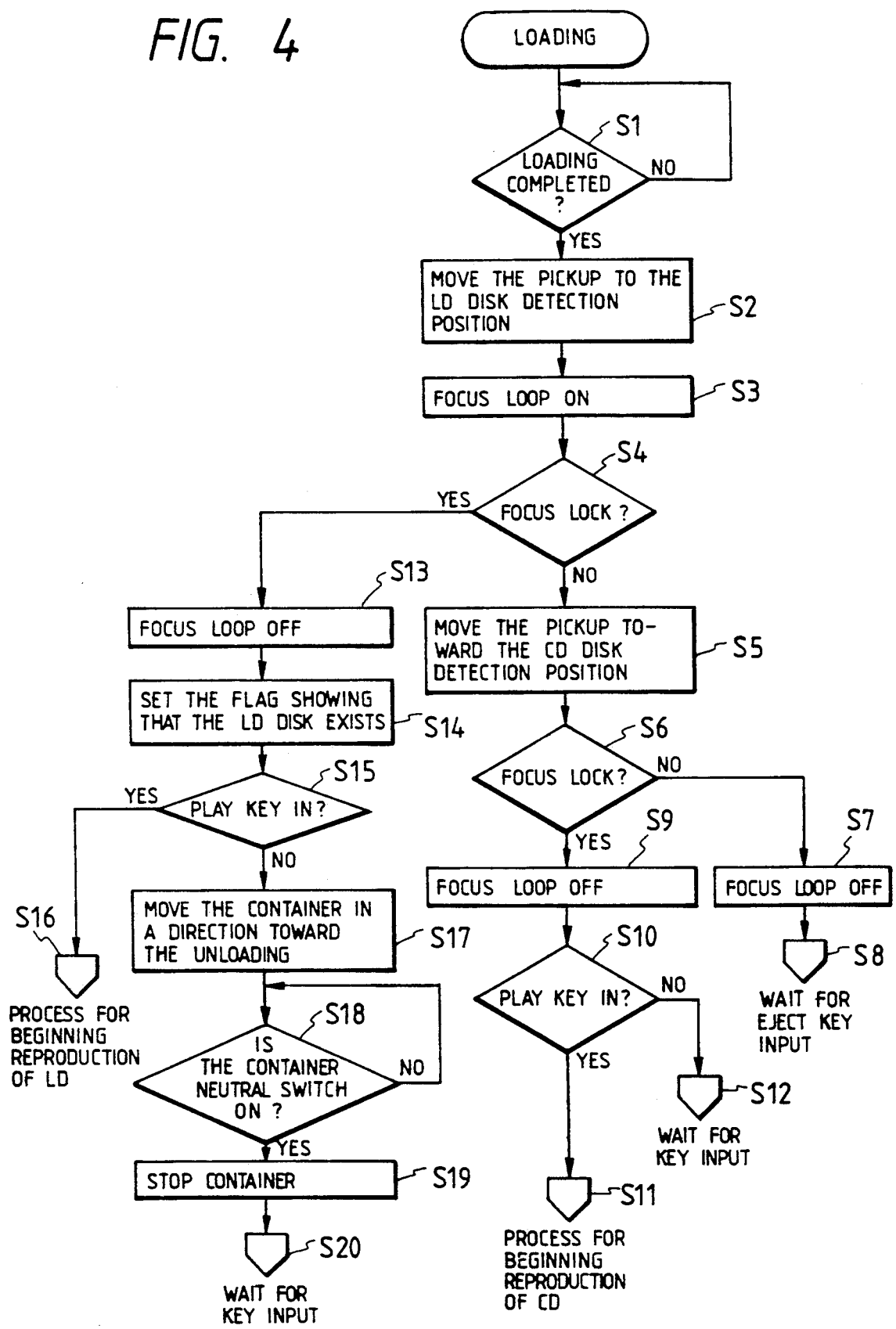

DISK RECORD/PLAYBACK MACHINE WITH DISK REST MOVABLE TO AN INTERMEDIATE POSITION BETWEEN THE DISK DISCHARGE AND RECORD/PLAYBACK POSITIONS DURING STAND-BY MODE

This is a continuation of application Ser. No. 07/230,827 filed Aug. 11, 1988 now abandoned.

FIELD OF THE INVENTION

The present invention relates to a disk record/playback machine, such as an optical disk player. More particularly, the invention relates to a record/playback machine, wherein during a stand-by mode of operation of the machine, a rest for supporting a disk is placed in a position located between the position of the rest during a record/playback mode and the position of the rest during a disk discharge mode.

BACKGROUND OF THE INVENTION

Since a single pickup can be used for both a compact disk and an optical video disk, an optical disk player capable of playing both types of disks has become popular. In a conventional disk player of such kind, a compact disk or a video disk is placed on a rest, and the rest is then driven by a motor to load the disk onto a turntable. The diameter of the turntable is made small so that the turntable does not hinder the movement of the pickup of the player. Although the small diameter of the turntable does not cause a problem for the compact disk which also has a small diameter, the small diameter of the turntable does cause a problem for the video disk which has a relatively large diameter. More particularly, the video disk is likely to warp due to its own weight if it is left unrotated on the small diameter turntable for a long period of time. In order to prevent the video disk from warping due to its own weight, it has been proposed to use a motor for vertically moving the video disk from the turntable. This motor is provided in addition to the loading motor (i.e., the motor for loading the disk onto the turntable). This additional motor serves to lift a rest (which supports the video or compact disk) to the same elevational position as in a disk discharge mode, to thereby hold the disk in that position during a stand-by mode of operation (i.e., the mode for waiting for a next command to be given). However, this previous solution to the warping problem results in a complicated construction of the disk player, which necessarily increases the cost of the machine. This previous solution has the further shortcoming of requiring a longer time to execute the next command after it is given, due to the fact that the compact or video disk is positioned far from the turntable during the stand-by mode. Thus, there is a need in the art for a disk record/playback machine which overcomes the aforementioned drawbacks.

SUMMARY OF THE INVENTION

Accordingly, it is an object of the present invention to provide a disk record/playback machine having a simple construction for preventing a disk from warping due to its own weight during a stand-by mode, while also being able to quickly execute an inputted command.

The present invention accomplishes these and other objects by providing a disk record/playback machine which comprises a carriage which is moved back and forth relative to the casing of the machine; racks slidably mounted on the carriage: locking means for locking the racks to the carriage; a rest on which a disk is supported; and cams for supporting the rest to the racks. The rest is placed in a first elevational position during a disk discharge mode, in a second elevational position during a record/playback mode, and in a third elevational position located between the first and the second elevational positions, during a stand-by mode.

The slidably mounted racks are locked to the carriage by locking means. The racks are formed with cams and the rest is supported by the racks through the cams. The carriage and the racks are moved together when the racks are locked thereto by the locking means. When the racks are unlocked from the carriage (i.e., when the carriage is moved to a prescribed position). the carriage is locked to the casing, and the racks are movable relative to the carriage. When the racks are moved relative to the carriage, the cams serve to move the rest in a direction perpendicular to the direction of the movement of the racks.

When the racks and the carriage are moved together during the disk discharge mode, the rest is positioned in the first elevational position. In the record/playback mode, the rest is positioned in the second elevational position which is located below the position of a turntable. When the rest is in the second elevational position, the disk is located on the turntable, not on the rest. During the stand-by mode, during which the player is waiting for the next command to be given, the rest is in the third elevational position which is located between the first and the second elevational positions, and which is higher than the position of the turntable.

The present invention provides a record/playback machine of simple construction. Further, the construction of the machine makes it possible not only to prevent the disk from warping due to its own weight, but also to quickly start the next recording or the next playback when it is commanded.

BRIEF DESCRIPTION OF THE DRAWINGS

FIGS. 4 and 5 and show flow charts of the disk loading mechanism.

DETAILED DESCRIPTION OF A PREFERRED EMBODIMENT

An embodiment of the present invention will hereafter be described in detail with reference to the drawings attached hereto.

Figure 2:
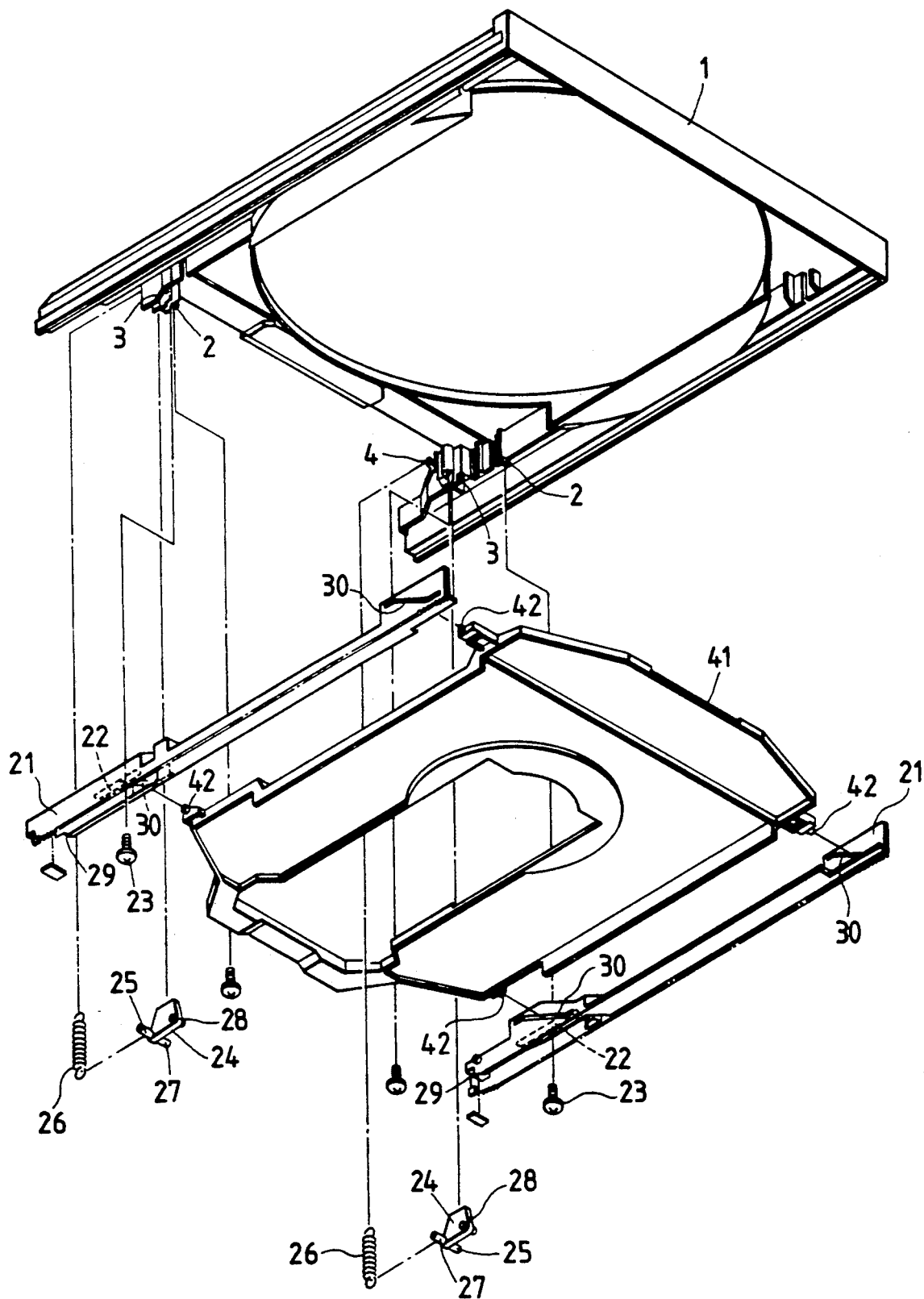
FIG. 2 shows an exploded perspective view of the disk loading mechanism of the disk record/playback machine.

As shown in FIG. 2, the disk loading mechanism of a disk record/playback machine according to the present invention includes a carriage 1 which is moved back and forth relative to the casing (not shown in the drawings) of the machine; a pair of racks 21 which have teeth engaged with drive gears (not shown in the drawings) and are attached to the right and left sides of the carriage 1 by laying screws 23 through the slender holes 22 of the racks 21 so that the screws 23 engage into the tapped holes 2 of the carriage, thereby allowing the racks 21 to be slid relative to the carriage 1 while being guided by the screws laid through the slender holes 22; stoppers 24 whose pins 28 are fitted in the grooves 3 of the carriage 1: springs 26 stretched between the projections 4 of the carriage 1 and projections 27 of the stoppers 24 to turn the stoppers clockwise about the pins 28 thereof to protrude the pins 25 of the stoppers downward (with regard to FIG. 2) and engage the pins 25 with the steps 29 of the racks 21; a rest 41 on the top of which a disk (not shown in FIG. 2) is placed, and pins 42 provided on the right and left sides of the rest 41 which are fitted on cams 30 obliquely provided in the racks 21 so that the rest is supported by the racks through the cams. The stoppers 24 and the springs 26 constitute locking means. When the racks 21 and the carriage 1 are locked to each other by the locking means, the racks and the carriage can be moved together.

Figure 3:
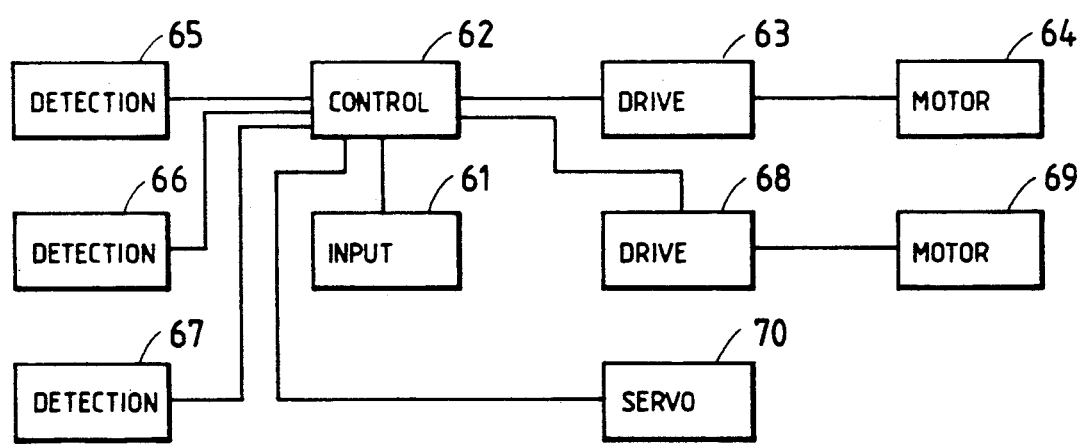
FIG. 3 shows a block diagram of the disk loading mechanism.

The operation of the disk loading mechanism will now be described with reference to FIG. 3. When prescribed inputting is performed by manipulating an input means 61 consisting of a switch or the like, a control circuit 62 consisting of a microcomputer or the like, controls a drive circuit 63 to rotate a motor 64 in a prescribed direction to turn the drive gears. The rotative forces of the drive gears are transmitted to the racks 21 to protrude the carriage 1 out of the casing. The disk to be played is then placed on the rest 41.

Figure 1:
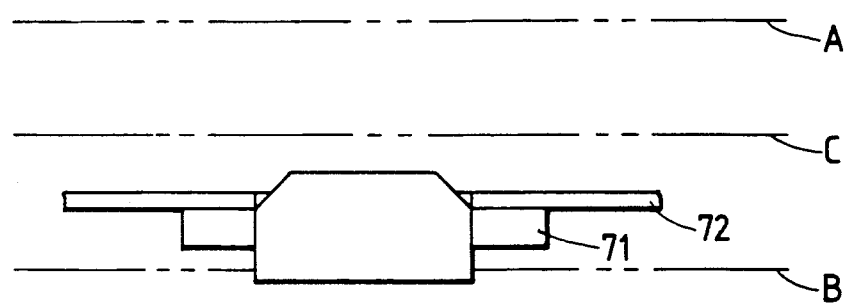
FIG. 1 shows a side view for describing the elevational positions of the rest of a disk record/playback machine according to an embodiment of the present invention.

When the loading of the disk onto the turntable 71 of the record/playback machine is commanded by manipulating the input means 61 further, the control circuit 62 regulates the motor 64 through the drive circuit 63 to rotate the motor in the reverse direction. The rotative force of the motor 64 is transmitted to the racks 21 to retract the carriage 1 into the casing of the machine. At that time, since the racks 21 and the carriage 1 are locked to each other by the locking means, the racks and the rest 41 are moved together with the carriage. In this mode of operation (i.e., in the disk discharge mode of the disk record/playback machine), the rest 41 is in an elevational position farthest from the turntable 71, as shown by line A in FIG. 1.

When the carriage is retracted to a prescribed position, the stoppers 24 are pushed counterclockwise by means (not shown in the drawings) to unlock the racks 21 and the carriage 1 from each other and stop the retraction of the carriage and the rest 41. At this time, the carriage 1 is locked to the casing by a means not shown in the drawings. As a result, the carriage 1 and the rest 41 are stopped where they are, but the racks 21 are retracted further. During the further retraction of the racks 21, the pins 42 are guided so that the rest 41 is moved down to an elevational position shown by line B in FIG. 1. Since the elevational position B for the record/playback mode of the disk record/playback machine is lower than the position of the turntable 71, the disk 72 placed on the top of the rest 41 is transferred from the rest onto the turntable as the rest is moved from elevational position A down to the elevational position B. The disk 72 is then clamped on the turntable 71, so that turntable 71 can be rotated together with the disk 72 thereon. Since the rest 41 at this time is located much lower than the turntable 71, the rest does not hinder the rotation of the turntable.

Referring to the flow-chart of FIG. 4, the loading operation of the record/playback machine will now be described. It is first determined whether the loading of the disk has been completed (S1). When the loading of the disk 72 onto the turntable 71 is completed as described above, a detection circuit 66 (shown in FIG. 3) consisting of a switch or the like, and being disposed in a prescribed position, sends out a detection signal. At that time, the control circuit 62 controls a motor 69 through a drive circuit 68 to move a pickup (not shown in the drawings) in the radial direction of the disk 72 to place the pickup in a prescribed position between the positions of the outer circumferential edges of the compact or video disk (S2). When the pickup is placed in the prescribed position, the control circuit 62 regulates a servo circuit 70 to turn ON a focusing servo loop (S3).

If the loaded disk 72 is the compact disk of small diameter, the pickup is placed outside the disk so that the focusing servo loop is not locked. On the other hand, if the loaded disk 72 is the video disk, then the focus servo loop is locked. It is then determined if the focusing servo loop is locked (S4). If the focus servo loop is not locked, the control circuit 62 then regulates the motor 69 through the drive circuit 68 to move the pickup to a prescribed position inside the outer circumferential edge of the compact disk (S5). The control circuit 62 then controls the servo circuit 70 when the pickup is in the prescribed position, so that the focusing servo loop is locked. It is then again determined if the focusing loop is locked (S6). If the focusing servo loop is not locked (i.e., the pickup is not in the prescribed position), the control circuit 62 regards the disk as not being loaded and turns off the focusing servo loop (S7) and waits for a discharge command to be given from the input means 61 (S8).

If it is detected that the focusing servo loop is locked,the control circuit 62 regulates the servo circuit 70 to turn off the focusing servo loop (S9). It is then determined if a playback (recording) command has been entered (S10). When a playback (recording) command is entered from the input means 61, playback is started (S11). When the playback (recording) command is not entered from the input means 61, the disk record/playback machine is set in a stand-by mode to wait for a next command to be entered (S12).

When it is detected that the focusing servo loop is locked as the pickup has moved to the prescribed position (S4), the focusing servo loop is turned off (S13) and a flag indicative of the loading of the video disk is set (S14). It is then judged whether or not an input command for the start of playback is given from the input means 61 (S15). If it is determined that the input command has been given, then reproduction of the video disk begins (S16). On the other hand, if it is determined that the input command is not given from the input means 61, the control circuit 62 regulates the drive circuit 63 to drive the motor 64 in a direction for unloading the disk (S17). As a result, the racks 21 are moved in a direction to go out of the casing. The rest 41 is then pushed by the cams 30 of the racks 21 so that the rest is lifted to an elevational position shown by line C in FIG. 1. A detection circuit 67 consisting of a switch or the like, and being disposed in a prescribed position, then sends out a detection signal. After is is determined that the detection signal has been sent (S18), the control circuit 62 stops acting to drive the motor 64, so that the rest 41 is halted when it is lifted to the elevational position shown by the line C in FIG. 1 (S19). The elevational position C is located between the elevational positions A and B, and is higher than the position of the turntable 71. As a result, the disk 72 is separated from the turntable 71 as the clamping of the disk, which is based on the urging force of a magnet, is ceased, so that the disk is put on the rest 41. Since the disk is supported on a relatively large area of the rest 41 as shown in FIG. 2, the disk does not warp due to its own weight even if the period of time when the disk record/playback machine remains in the stand-by mode until the entry of the next command is long (S20). This is in contrast with conventional disk record/playback machine in which a compact disk is left unrotated on a turntable.

The rest 41 can be lifted to the elevational position A for the discharge (loading) of the disk. However, since the racks 21 are locked to the carriage 1 and the carriage is not locked to the casing when the rest 41 is in the elevational position A, an additional mechanism for locking the carriage to the casing as the rest is moved to elevational position A needs to be provided. However, since the racks 21 are unlocked and the carriage 1 is already locked to the casing when the rest 41 is in the elevational position C according to the invention, an additional mechanism for locking the carriage to the casing when the rest is in the elevational position C does not need to be provided. Therefore, it is preferable that the rest 41 is stopped in the elevational position C as done in this embodiment.

Although an exclusive motor for vertically moving the rest 41 can be provided, the provision of the exclusive motor complicates the construction of the disk record/playback machine and increases the cost thereof. Therefore, it is preferable that the rest 41 is vertically moved by the loading motor 64 as done in this embodiment.

When a next playback command is entered by manipulating the input means 61 during the stand-by mode, the playback of the disk 72 is immediately started if the disk is the compact disk, because it is already located on the turntable 71. If the disk 72 is a video disk, the control circuit 62 regulates the motor 64 again to move down the rest 41 to the elevational position B. Since the elevational position C is near the elevational position B, the time which elapses until the playback of the video disk is started is not long.

Figure 5:
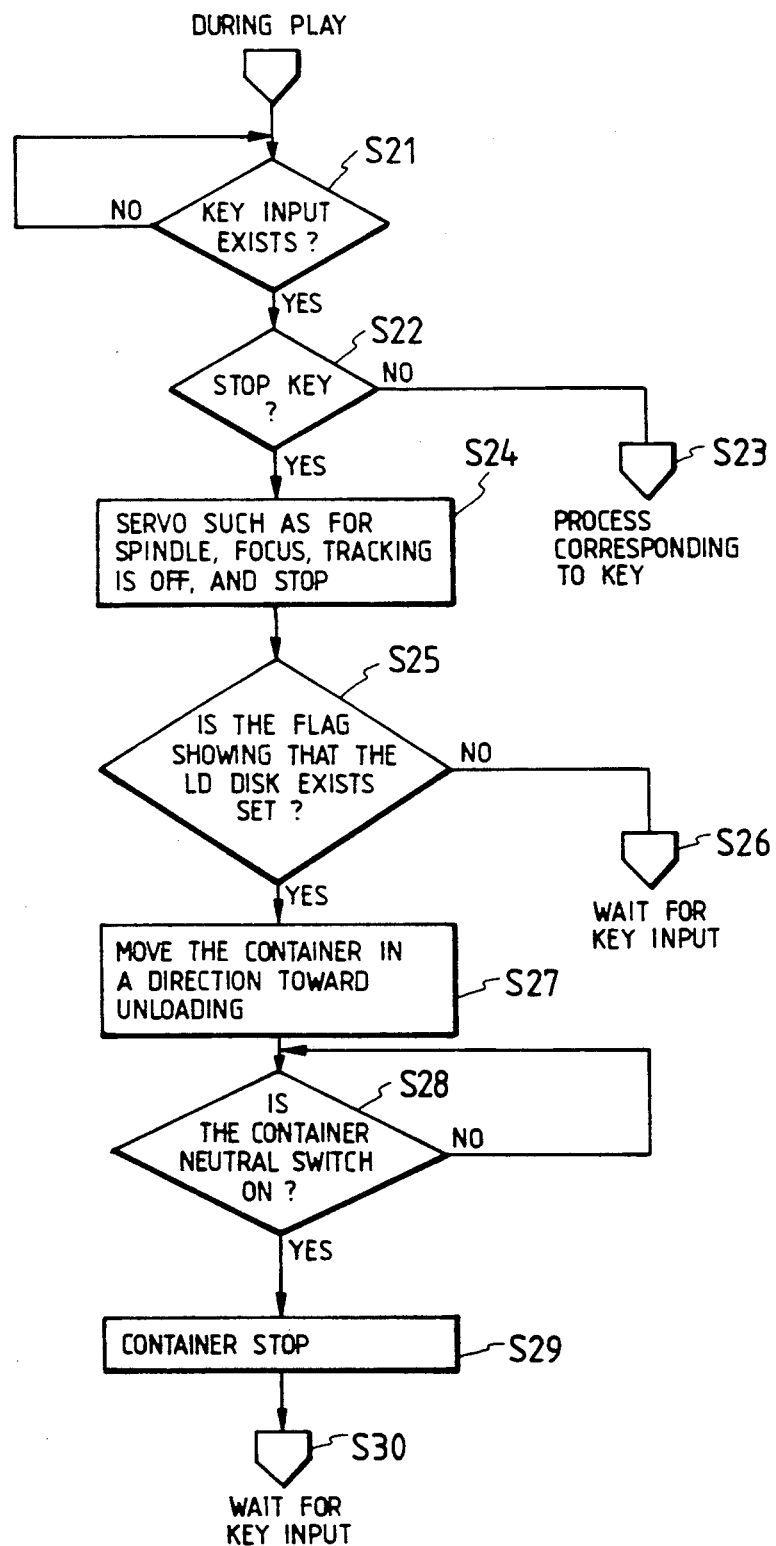

Referring now to the flow chart of FIG. 5, when a prescribed input command is given from the input means 61 during the playback of the disk (S21), an action corresponding to the input command (S23) is performed if the input command is not a stop command. More particularly, it is first determined if the stop command has been inputted (S22). If it is determined that the stop command is inputted from the input means 61, the control circuit 62 regulates the servo circuit 70 to turn ON the focusing servo loop and turn off a spindle servo loop, a tracking servo loop and so forth to perform a stop action (S24). It is then determined if the flag indicative of loading is set (S25). If the flag indicative of the loading of the video disk is not set, namely, the loaded disk is the compact disk, the disk record/playback machine waits for a next command to be entered (S26). If the flag is set, namely, the loaded disk is the video disk, the control circuit 62 acts to drive the motor 64 to move the racks 21 in the directions for unloading (S27), to lift the rest 41. It is then determined if the detection circuit 67 has outputted a detection signal (S28). When the detection circuit 67 has outputted the detection signal, the rest 41 is stopped where it is (S29), and the machine waits for the next key input (30).

When a detection circuit 65 which monitors the operation mode of the disk record/playback machine has detected the end of playback of a program on the video disk, the rest 41 is lifted to the intermediate elevational position C and the machine is set in the stand-by mode, similar to the above-described operation.

WHAT IS CLAIMED IS:

1. A disk record/playback machine, comprising:
a carriage which is moved back and forth relative to a casing:
racks slidably mounted on said carriage;
a rest for supporting a disk; and
cams for supporting said rest to said racks, said cams being operable for moving said rest to a first discrete elevational position in a disk discharge mode, to a second discrete elevational position in a record/playback mode, and to a third discrete elevational position located between said first and second discrete elevational positions, in a stand-by mode.

2. The record/playback machine according to claim 1, wherein said rest which is at least as large as the diameter of the disk.

3. The record/playback machine according to claim 1, further comprising means for locking said racks to said carriage.

4. The record/playback machine according to claim 3, wherein said locking means comprises stoppers fitted to said carriage, and springs connected between said carriage and said stoppers, and wherein said stoppers are operable for unlocking said racks from said carriage when said carriage is moved to a predetermined position within said casing.

5. The record/playback machine according to claim 4, further comprising control means for controlling the movement of said racks, said cams being operable for moving said rest from the first elevational position to the second or third elevational position when said control means moves said racks from the predetermined position further into said casing.

6. The record/playback machine according to claim 1, further comprising a turntable located in the machine, the first and third elevational positions being located above said turntable, and the second elevational position being located below said turntable.

7. The record/playback machine according to claim 6, further comprising means for placing the disk on said turntable as said cams move said rest pass said turntable to the second elevational position, and for placing the disk from said turntable onto said rest as said cams move said rest from the second elevational position pass said turntable.

8. A disk record/playback machine, comprising:
a carriage which is moved back and forth relative to a casing;
racks slidably mount on said carriage;
a rest for supporting a disk;
cams for supporting said rest to said racks, said cams being operable for moving said rest to a first discrete elevational position, to a second discrete elevational position, and to a third discrete elevational position located between said first and second discrete elevational positions;
a turntable located in the machine, the first and third discrete elevational positions being located above said turntable, and the second discrete elevational position being located below said turntable;
means for placing the disk from said rest onto said turntable as said rest moves the disk from said first or third discrete elevational position to the second discrete elevational position, and for placing the disk onto said rest when said rest moves from the second discrete elevational position to said first or third discrete elevational position; and means for detecting if the disk is a video disk or a compact disk, said rest being moved to the second discrete elevational position in a stand-by mode if the disk is detected to be a compact disk, and said rest being moved to the third discrete elevational position in the stand-by mode if the disk is detected to be a video disk.

9. A disk record/playback machine, comprising:

a rest for supporting a disk;

means for moving said rest to a first discrete elevational position in a disk discharge mode of operation, to a second discrete elevational position in a disk record/playback mode of operation, and to a discrete third elevational position located between the first and second discrete elevational positions in a stand-by mode of operation.

* * * * *